(12) United States Patent
Karmi et al.

(10) Patent No.: US 7,630,445 B1
(45) Date of Patent: Dec. 8, 2009

(54) ESTABLISHING SLOT BOUNDARIES OF SLOTS OF A DIVERSITY CONTROL FEEDBACK SIGNAL

(75) Inventors: Yair Karmi, Bridgewater, NJ (US); Phil Fu-Wei Chen, Denville, NJ (US)

(73) Assignee: Magnolia Broadband Inc., Bedminster, NJ (US)

( * ) Notice: Subject to any disclaimer, the term of this patent is extended or adjusted under 35 U.S.C. 154(b) by 614 days.

(21) Appl. No.: 11/258,937

(22) Filed: Oct. 25, 2005

(51) Int. Cl.
*H04B 14/06* (2006.01)

(52) U.S. Cl. ............... 375/247; 375/142; 375/144; 375/371; 370/201; 370/311; 370/509; 370/350; 340/572; 340/505

(58) Field of Classification Search ............... 375/130, 375/219, 150, 140, 142, 144, 371; 370/208, 370/229, 201, 311, 509, 350; 340/572, 505
See application file for complete search history.

(56) References Cited

U.S. PATENT DOCUMENTS

| | | | |
|---|---|---|---|
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,061,966 B2 * | 6/2006 | Storm et al. | 375/145 |
| 7,130,663 B2 * | 10/2006 | Guo | 455/562.1 |
| 7,349,379 B2 * | 3/2008 | Schmidl et al. | 370/342 |

(Continued)

FOREIGN PATENT DOCUMENTS

EP    0 986 193    3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner*—Chieh M Fan
*Assistant Examiner*—Eva Y Puente
(74) *Attorney, Agent, or Firm*—Pearl Cohen Zedek Latzer, LLP

(57) ABSTRACT

Establishing slot boundaries includes receiving a feedback signal reflecting feedback information describing a signal modified according to a diversity parameter adjustment. The feedback signal includes slots and bits. A slot boundary is established for each of the slots by: partitioning the bits into periods; comparing the bits of each period; and establishing the slot boundaries in accordance with the comparison.

13 Claims, 2 Drawing Sheets

U.S. PATENT DOCUMENTS

| | | | |
|---|---|---|---|
| 7,379,752 B2 * | 5/2008 | Yan | 455/552.1 |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2005/0276339 A1 * | 12/2005 | Chow et al. | 375/260 |

FOREIGN PATENT DOCUMENTS

| | | |
|---|---|---|
| EP | 1 282 242 | 2/2003 |
| EP | 1 284 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Pending Patent Application entitled, *"Establishing Frame Timing Of Frames Of A Diversity Control Feedback Signal"*, 29 pages specification, claims and abstract, 2 pages of drawings, inventor Yair (nmi) Karmi, Oct. 25, 2005.

* cited by examiner

ESTABLISHING SLOT BOUNDARIES OF SLOTS OF A DIVERSITY CONTROL FEEDBACK SIGNAL

TECHNICAL FIELD

This invention relates generally to the field of wireless communications and more specifically to establishing slot boundaries of slots of a diversity control feedback signal.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for determining diversity parameter adjustments may be reduced or eliminated.

According to one embodiment of the present invention, establishing slot boundaries includes receiving a feedback signal reflecting feedback information describing a signal modified according to a diversity parameter adjustment. The feedback signal includes slots and bits. A slot boundary is established for each of the slots by: partitioning the bits into periods; comparing the bits of each period; and establishing the slot boundaries in accordance with the comparison.

Certain embodiments of the invention may provide one or more technical advantages. A technical advantage of one embodiment may be that application of a transmit diversity control technique may require the recovery of slot-based information and the application of diversity parameter adjustments in accordance with slot timing. Slot timing may be recovered from the power control of the transmit signal, if, for example, slot timing is not available from decoding of air interface signals.

A technical advantage of another embodiment may be that a next diversity parameter adjustment may be synchronized with the boundary of a transmission slot, thus activating the diversity control concurrently with the transmit power changes. A technical advantage of another embodiment may be that the frame timing of the signal is determined using the slot power values. A transmit diversity control technique may be applied in accordance with the frame timing to determine the next diversity parameter adjustment, which may improve the technique.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
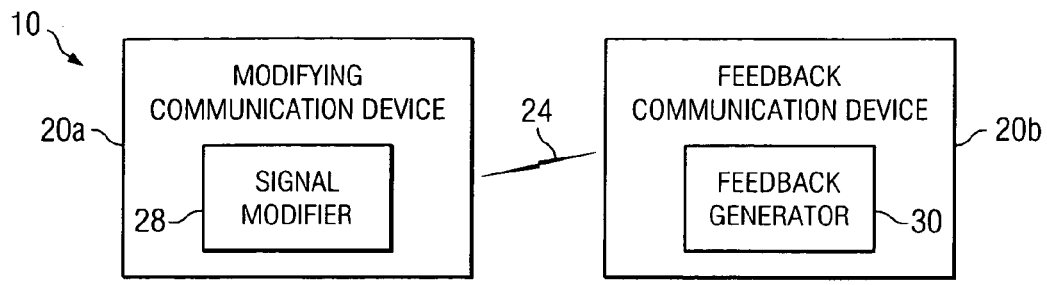
FIG. 1 is a block diagram illustrating one embodiment of a communication network that includes a modifying communication device that determines diversity parameter adjustments.

FIG. 1 is a block diagram illustrating one embodiment of a communication network 10 that includes a modifying communication device 20a that determines diversity parameter adjustments. According to the embodiment, modifying communication device 20a applies a diversity parameter adjustment to a signal transmitted to feedback communication device 20b. Feedback communication device 20b returns feedback information that describes the signal as received by feedback communication device 20b. Modifying communication device 20a determines a next diversity parameter adjustment that reflects the feedback information. The next diversity parameter adjustment may be determined by establishing the boundaries of slots of a feedback signal that reflects the feedback information and estimating the slot power values of the slots. The frame timing of the signal is determined using the slot power values, and a transmit diversity control technique is applied in accordance with the frame timing to determine the next diversity parameter adjustment.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Example communication protocols and technologies include those set by the Institute of Electrical and Electronics Engineers, Inc. (IEEE) 802.xx, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Communication network 10 includes one or more modifying communication devices 20a and one or more feedback communication devices 20b that communicate via a wireless link 24. A communication device 20 represents any device operable to communicate information via signals with one or more other communication devices 20. For example, communication device 20 may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (IP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

A communication device 20 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b.

Modifying communication device 20a includes a signal modifier 28 that modifies one or more signals in accordance with feedback information received from feedback communication device 20b. According to one embodiment, modifying a signal may be described as applying a diversity parameter adjustment. According to the embodiment, a diversity parameter represents a feature of a signal that may be modulated, for example, relative phase, relative amplitude, absolute power, frequency, timing, other suitable signal feature that may be modulated, or any combination of the preceding. Relative phase may refer to the phase difference between the phase of a first signal for a first transmit antenna element and the phase of a second signal for a second transmit antenna element. Relative amplitude may refer to the ratio between the amplitude of the first signal and the amplitude of the second signal. Absolute power may refer to the total power transmitted by modifying communication device 20a.

A signal may be modified by applying a diversity parameter adjustment to the signal, which may increase constructive interference or reduce destructive interference. According to one embodiment, a next diversity parameter adjustment $\vec{f}(k+1)$ may be calculated from a current diversity parameter $\vec{f}(k)$ and a diversity parameter increment $\Delta \vec{f}(k)$ according to Equation (1):

$$\vec{f}(k+1) = \vec{f}(k) + \Delta \vec{f}(k) \qquad (1)$$

where k represents an iteration.

Signal modifier 28 may use feedback information to determine a diversity parameter adjustment for a next window. The feedback information may indicate, for example, whether modifying communication device 20a should increase or reduce transmission power. Feedback information may be obtained from a feedback signal in any suitable manner. According to a first technique, signal modifier 28 obtains feedback information from a quality indication signal received from feedback communication device 20b. A quality indication signal may refer to a signal that describes a quality of a signal transmitted by modifying communication device 20a as received by feedback communication device 20b.

According to a second technique, signal modifier 28 obtains feedback information from a control signal generated by a baseband subsystem of modifying communication device 20a. A control signal may refer to a signal that provides instructions to a component of a communication device. According to the embodiment, the baseband subsystem extracts feedback information from a quality indication signal from feedback communication device 20b, and generates a control signal that reflects the feedback information. For example, the control signal may provide instructions on whether to increase or reduce transmission power in accordance with the feedback information.

According to one embodiment, a control signal may comprise a pulse-density modulation (PDM) signal comprising a sequence of bits. The sequence may have any suitable length to provide acceptable resolution. For example, a length in the range of 100 to 10,000 bits may provide acceptable resolution to meet the requirements of the 0.25 decibel to 1 decibel reverse power steps of the CDMA2000 1× and EvDO standards or up to 2 decibels of the WCDMA standard. The period may be sufficiently short to support integration by means of a low pass filter and to support a fast response to designated power steps. For example, the sequence frequency may be 19,000 to 20,000 sequences per second, such as approximately 19,200 sequences per second.

A control signal may reflect factors other than those resulting from a diversity parameter adjustment. As a first example, the control signal may reflect an adjustment designed to maintain the power within the boundaries of a power mask. As a second example, the control signal may reflect an adjustment designed to maintain a constant energy per bit. As a third example, the control signal may reflect an adjustment made in response to interference levels and reception levels.

Feedback communication device 20b includes a feedback generator 30 that generates feedback information that reflects the quality of the modified signals. The feedback information may include one or more quality indicators. According to one embodiment, a quality indicator may instruct modifying communication device 20a to increase or decrease transmission power. An up value instructs modifying communication device 20a to increase the total power of its transmitted signal, and a down value instructs modifying communication device 20a to decrease the total power. A quality indicator may comprise, for example, a power control bit of a code division multiple access (CDMA) power control signal. The quality indicators may be sent to modifying communication device 20a in a quality indication signal.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to communication network 10 without departing from the scope of the invention. Additionally, operations of communication network 10 may be performed using any suitable logic. As used in this document, "each" refers to each member of a set or each member of a subset of a set. A subset of a set may include none, some, or all elements of the set.

Figure 2:
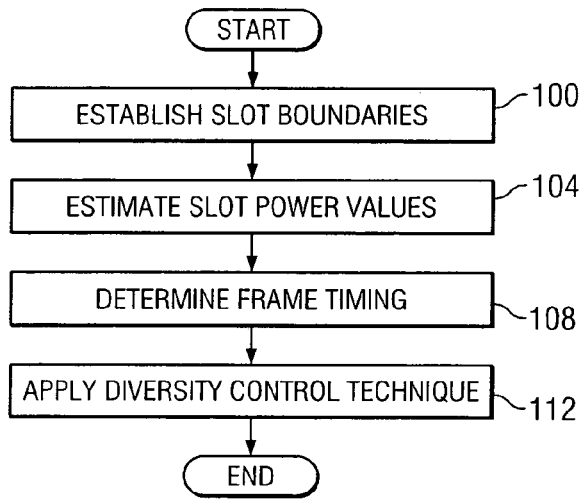
FIG. 2 is a flowchart illustrating one embodiment of a method for determining diversity parameter adjustments that may be used by the signal modifier of FIG. 1.

FIG. 2 is a flowchart illustrating one embodiment of a method for determining diversity parameter adjustments that may be used by signal modifier 28 of FIG. 1. According to the embodiment, a feedback signal that reflects feedback information is received. Slot boundaries of the signal are established in order to determine slot power values and to apply a diversity control technique. The frame timing of the signal is determined from the slot power values to identify portions of the frames available for feedback information. A transmit diversity control technique is applied to determine the next diversity parameter adjustment. The next diversity parameter adjustment is applied in accordance with the frame timing.

The method begins at step 100, where slot boundaries of a feedback signal are established. According to one embodiment, a frame of a feedback signal may have one or more slots having the same or different durations and separated by slot boundaries. A slot may include one or more power samples corresponding to one or more channels. The samples reflect the power of the transmitted signal as received by feedback communication device 20b. A slot power value may be estimated from the one or more power samples. A slot boundary may be established to identify samples corresponding to a slot. Any suitable slot boundary method may be used to establish a slot boundary, for example, the methods described with reference to FIGS. 3 and 4.

Received feedback or transmit power control may be used to change the slot power values. The received feedback may be decoded after receiver synchronization, such as receiver synchronization to slot boundaries. If power control and slot timing are not available, slot power values are estimated from the power samples at step 104. The slot power values may be estimated during or after establishing the slot boundaries. The activity levels of the channels of the samples may be known or unknown. If the activity levels are known, samples within the slot boundaries may be used to determine the slot power value. Different activity levels may yield a higher power value for a sample of active channels and a lower power value for a sample with no active channels. To compare the power of slots having different activity levels, the method may compensate for the difference between the higher power and the lower power.

If the activity levels are not known, the slot power value may take into account the activity of channels that change during a mid-slot transition. The slot power value may then be selected in any suitable manner. As a first example, the value may be selected using the minimum sample of a slot. As a second example, the value may be selected as the minimum sample of a set of samples of the slot, where the set comprises samples that are sequentially repeated two, three, or more times. As a third example, the value may be selected from a sample of a predetermined part of the slot, such as a sample from the second half or third one-third of a slot. As a fourth example, the value may be selected from a particular sample, such at the $19^{th}$ sample, of a slot.

The frame timing is determined at step 108. According to one embodiment, frame timing may be determined by the baseband processor of the signal indicator. According to another embodiment, determining frame timing may refer to establishing the timing of portions of frames available for feedback information. The timing of available portions may be established by identifying slots that are unavailable for feedback information. Diversity parameter adjustments may be applied to avoid the unavailable slots.

Unavailable slots may include slots that are designated for information other than feedback information. As an example, a forward frame may include time multiplexed power control and other information. A slot of the forward frame may yield a locked-control power response slot of a reverse frame that is unavailable for feedback information. The forward frame may include time multiplexed power control and other information. Any suitable locked slot identification method may be used to determine the timing of the lock slots of frames, for example, the method described with reference to FIG. 5.

Unavailable slots may include slots that carry unreliable feedback information. In certain cases, a slot may typically include feedback information, but the information may be unreliable. As an example, in slot power control feedback, the first slot in the frame typically may include feedback information. This slot, however, may be unavailable when using the slot power as the control feedback since power change values corresponding to a frame boundary provide unreliable feedback information. A frame boundary may refer to the initial boundary of the initial slot of a frame. In the example, data rate changes for the reverse channel occur at a frame boundary. The data rate change may yield a transmit power change that is significantly greater than the transmit power change in response to a diversity parameter adjustment. Accordingly, the resulting quality indication signal may not accurately reflect the transmit power change in response to a diversity parameter adjustment.

A diversity control technique is applied at step 112. The diversity control technique may be applied before or after determining frame timing. Diversity parameter adjustments may be applied to avoid responses that would be carried in unavailable slots. The delay between applying a diversity parameter adjustment and receiving feedback information in response to the adjustment then may be taken into account in order to avoid the unavailable slots. The delay may depend upon system timing. As an example, the delay for a slot at the frame boundary or frame mid-point may be greater than the delay for other slots.

Any suitable transmit diversity control technique may be applied, for example, a perturbation technique or a window technique. According to an example perturbation technique, feedback information is obtained from a quality indication signal from feedback communication device 20b. Adjustments may be applied to consecutive slots in accordance to the feedback information. As an example, a larger adjustment may be applied to a first slot, and a smaller adjustment may be applied to a second slot. A larger adjustment may be defined as $\vec{f}_L(k+1) = \vec{f}(k) + \Delta \vec{f}(k)$, and a smaller adjustment may be defined as $\vec{f}_S(k+1) = \vec{f}(k) + \Delta \vec{f}(k)$.

The feedback information for the adjustments may indicate a power increase for one adjustment and a power decrease for the other adjustment. A next adjustment may be made in the direction of the adjustment associated with the power decrease.

According to an example window technique, feedback information is obtained from a control signal generated at modifying communication device 20a in response to a quality indication signal. A window of a control signal corresponds to a frame. A window may have slots that correspond to the slots of the frame of a quality indication signal. According to one embodiment, a window may have a size that may be readily synchronized with the size of the frames. As an example, the window size may be multiples of the half size or full size of a frame.

A window may have a window power value representing the power of a window. According to one embodiment, the power of a window may be calculated from the average or sum of the slot power values of the participating slots of the window. As an example, the power PW(k) of window k may be given by:

$$PW(k) = \frac{M}{N} \sum_{j=1}^{N} P(j, k)$$

where P(i,k) represents the slot power of slot i of window k, N represents the number of participating slots, and M represents the number of slots of window k. A power change may refer to the difference between the power of a preceding window and the power of a current window. As an example, the power change ΔPW(k) between window k and window (k−1), may be given by ΔPW(k)=PW(k)−PW(k−1).

According to another embodiment, the power of a window may be calculated using the cumulative power controls from a reference slot to a calculated slot. The power of a reference slot for a preceding window may be assigned a reference value. The equivalent slot power of each slot of the preceding and current windows may computed according to the cumulative power controls from the reference slot to the calculated slot. As an example, the equivalent slot power for slot i of window k−1 may be calculated according to:

$$P(i, k-1) = P(0) + \sum_{j=1}^{i} \Delta P(j)$$

where $i_r$ represents the reference slot, $P(i_r, k-1)$ represents the reference slot power, and ΔP(i) [dB] represents the change caused by the power control of slot i. The equivalent slot power for slot i in window k may be calculated according to:

$$P(i, k) = P(0) + \sum_{j=1}^{M} \Delta P(j, k-1) + \sum_{j=1}^{i} \Delta P(j, k)$$

A window may have a power trend. A power trend of a window may refer to the change of power within the window. According to one embodiment, the power trend may be calculated by taking the difference between the power value of an initial participating slot and the power value of a final participating slot. A power trend change may refer to the difference between the trend of a preceding window and the trend of a current window.

A diversity parameter adjustment may be determined in accordance with the feedback information reflected in the power trend change and power change. If the feedback information for an adjustment in one direction indicates that the power should be decreased, a next adjustment may be made in the same direction. Otherwise, the next adjustment may be made in the other direction.

After applying the diversity control technique, the method terminates.

Modifications, additions, or omissions may be made to the method without departing from the scope of the invention. The method may include more, fewer, or other steps. Additionally, steps may be performed in any suitable order without departing from the scope of the invention.

Figure 3:
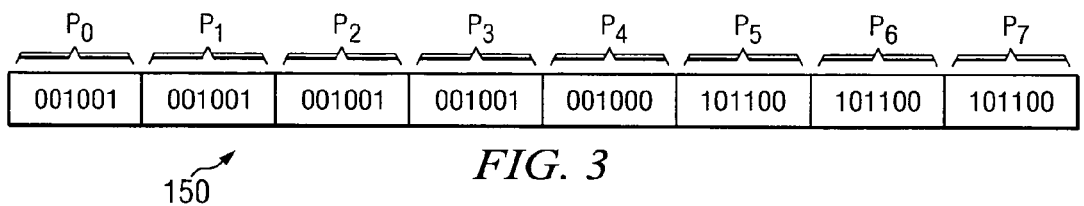
FIG. 3 is a diagram of an example sequence illustrating one embodiment of a method for establishing a slot boundary that may be used with the method of FIG. 1.

FIG. 3 is a diagram of an example sequence 150 illustrating one embodiment of a method for establishing a slot boundary that may be used with the method of FIG. 1. According to the embodiment, slot boundaries may be established from the power transitions of a control signal. Example sequence 150 represents a control signal and comprises a sequence of bits divided into periods $P_i$, where i equals, for example, 0, 1, ..., 7. A period $P_i$ may represent a sample that may be used to establish the power value of a slot. Each period $P_i$ may include any suitable number of bits, for example, six bits, where each bit may be either zero or one.

According to one embodiment, the ratio of one to zeros of a period may indicate a period power value of the period. If the number of bits per period is consistent, the density of ones may indicate the power value. The density of ones in example sequence 150 is described by TABLE 1, where $x_i$ represents the number of ones of period $P_i$.

TABLE 1

| $P_i$ | $P_0$ | $P_1$ | $P_2$ | $P_3$ | $P_4$ | $P_5$ | $P_6$ | $P_7$ |
|---|---|---|---|---|---|---|---|---|
| $x_i$ | 2 | 2 | 2 | 2 | 1 | 3 | 3 | 3 |

A power transition may be identified from a change in the power values of the periods, which may be measured by the difference between the densities of ones of the periods. According to one embodiment, the density difference $D_{i,j}$ of a period $P_i$ may be given as $D_{i,j} = x_i - x_j$, where i−j=n and n represents the distance between periods. For example, n=1 corresponds to two consecutive periods, n=2 corresponds to two periods with a period between them, and n=3 corresponds to two periods with two periods between them. The differences between the densities for example sequence 150 are presented in TABLE 2.

TABLE 2

| $D_{0,-2}$ | $D_{1,-1}$ | $D_{2,0}$ | $D_{3,1}$ | $D_{4,2}$ | $D_{5,3}$ | $D_{6,4}$ | $D_{7,5}$ |
|---|---|---|---|---|---|---|---|
|  |  | 0 | 0 | −1 | 1 | 2 | 0 |

A power transition may have any suitable definition. As a first example, a transition may be defined as a period that has a non-zero density difference. In the first example, sequence 150 has three transitions, given by periods $P_4$, $P_5$, and $P_6$. As a second example, a transition is identified as the first non-zero difference. Subsequent differences for a duration of m slots are not identified as transitions, where m may be any suitable number such as m=1, 2, 3, or 4, or may be approximately equal to half a slot. In the second example, if m≧3, sequence 150 has one transition, given by period $P_4$. As another example, a transition may be discarded if the density returns to a previous value when a difference between densities returns to zero.

A slot boundary may be identified from the transitions in any suitable manner. As a first example, the most probable start sample may be defined as the sample with the most transitions. As a second example, the most probable start sample may be determined from the sample with the most transitions shifted by a constant number to reflect the statistics of the shifted windows. As a third example, contiguous difference values may be summed together to yield the value of a moving window. The number of moving windows may be the same as the number of samples.

A power transition may indicate a slot boundary or a mid-slot power change. A mid-slot power change does not reflect the feedback information, and typically is negative. If transitions are found for only one portion of a slot, then the portion corresponds to a slot boundary. If transitions are found in two portions of the slot, where the two portion are separated by half a slot, the portion having more negative transitions may correspond to the mid-slot transition, and the portion having more positive transitions may correspond to a slot boundary. As an example, only positive power transitions may be considered.

According to one embodiment, diversity parameter data collected from the feedback information may be used in establishing the slot boundaries. Diversity parameter data may refer to information describing diversity parameters from previously applied adjustments. Diversity parameter data may comprise, for example, phase data describing the phase from previously applied adjustments.

According to one embodiment, the diversity parameter data may be expressed as a diversity parameter histogram of diversity parameter values. The histogram may indicate the frequency distribution of the diversity parameter values over a diversity parameter variable. According to one embodiment, the histogram may comprise a modulo-period-based histogram of detected PDM transitions. As a first example, a histogram may describe transitions that mainly characterize slot timing, such as power decreases in EvDO. As a second example, a histogram may take into account statistics of positive and negative transitions. The histogram may associate the transitions with characteristics of the air interface. For instance, the histogram may record PCB-related transitions in the first two thirds of a 1× slot or RPC and channel activation transitions in EvDO. As a third example, a histogram may be dynamic, where newer transitions are added to older transitions. At least some of the older transitions may be discarded. For instance, newer transitions may be added to a statistical function of older transitions, and the compound function of at least some of the older transitions may decay.

Modifications, additions, or omissions may be made to the method without departing from the scope of the invention. The method may include more, fewer, or other steps. Additionally, steps may be performed in any suitable order without departing from the scope of the invention. According to one embodiment for detecting power transitions, n-behind threshold-exceeding differences of the values of a PDM sequence are established, and the next m differences are ignored. According to another embodiment, the start of threshold-exceeding transition is detected between repeated values of the PDM sequence. According to yet another embodiment, the start of a PDM sequence is detected by comparing sequences one-period behind, then one of the previous two is performed.

Figure 4:
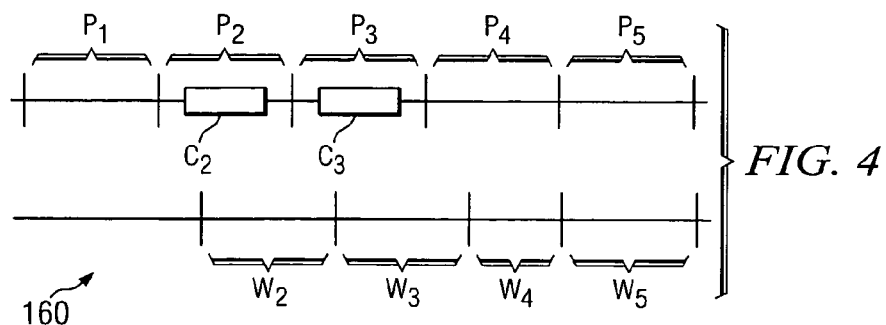
FIG. 4 is a diagram of an example sequence illustrating another embodiment of a method for establishing a slot boundary that may be used with the embodiment of the method of FIG. 2.

FIG. 4 is a diagram of an example sequence 160 illustrating another embodiment of a method for establishing a slot boundary that may be used with the embodiment of the method of FIG. 2. Sequence 160 includes actual periods $P_i$, where i=1, 2, . . . 5. Windows $W_i$ may be synchronized with actual periods $P_i$ to estimate the timing of actual periods $P_i$.

A first period may have the same or different sequence as that of a second period. If the sequences are different, bits $C_2$ and $C_3$ may represent the changed bits. A changed bit may refer to a bit of a subsequent period that has a different value than that of a bit in the same position of a previous period.

Window $W_2$ may be positioned approximately at bit $C_2$. According to one embodiment, there may be one, two, or three periods between the windows. As a first example, window $W_3$ may be started one period later, unless there is a changed bit before one period later. As a second example, window $W_3$ may be started two or more periods later, unless there was a changed bit within the two or more periods. As a third example, window $W_3$ may be started a specified duration and one or more periods later, if there is no changed bit within the duration and the one or more periods. Based on bits $C_2$ and $C_3$, the end of window $W_4$ may be corrected to synchronize windows $W_i$ with actual periods $P_i$.

Modifications, additions, or omissions may be made to the method without departing from the scope of the invention. The method may include more, fewer, or other steps. Additionally, steps may be performed in any suitable order without departing from the scope of the invention.

According to one embodiment, the length of a period may be determined. For example, the unknown sequence length n may be found by searching for a n that satisfies Equation (2):

$$\sum_{i=0}^{N} [PDM(i) \oplus PDM(i-n)] = N \qquad (2)$$

where PDM represents a bit, and N may be any desired threshold, for example, N=100 bits.

Figure 5:
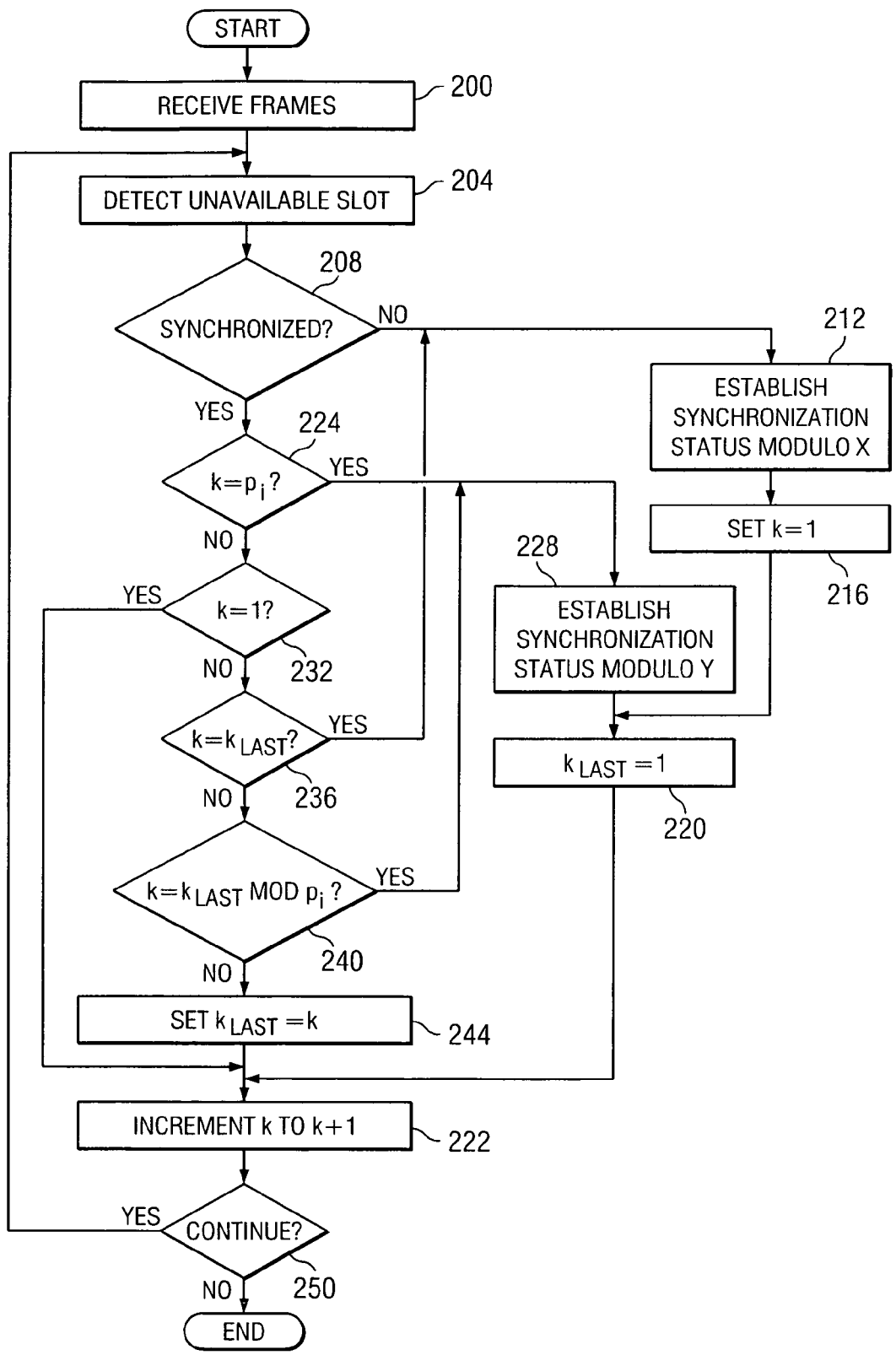
FIG. 5 is a flowchart illustrating one embodiment of a method for determining frame timing for frame-based air interfaces.

FIG. 5 is a flowchart illustrating one embodiment of a method for determining frame timing. According to the embodiment, frame timing may be determined using a slot that has a dedicated position in a frame, such as an unavailable slot. When the slot is detected, a counter may be set in accordance with the detection of the slot to establish the frame timing. In one example, the unavailable slot comprises a lock response slot. Any other unavailable slot, however, may be used.

According to the illustrated embodiment, counter k tracks slots. Counter k may be a modulo x slot counter, where x represents the number of slots of a frame. In the example, $x=16$, and $k=1, \ldots, 16$. Frame timing synchronization may be used to control counter k such that counter k indicates unavailable slots. In the example, the counter may indicate unavailable slots at $k=1$ and $k=p_i$, where $p_i$ represents the slot number of the ith unavailable slot of a frame, for example, $i=1$, and $p_1=x/2+1=9$.

The method begins at step 200, where frames are received. The frames include slots that each have a slot power value. An unavailable slot is detected at step 204. An unavailable slot may be detected in any suitable manner. According to one embodiment, the difference between a slot power value of slot k and the slot power value of the previous slot k−1 is determined. An unavailable slot may be designated as detected if the difference satisfies a threshold. For example, a value smaller than the minimum slot power value difference associated with diversity parameter adjustment may be selected as the threshold value, and a difference that is less than the threshold value may be designated as an unavailable slot. If an unavailable slot is detected at step 204, the method proceeds to step 208.

The frames may be synchronized at step 208. If the frames are not synchronized at step 208, the method proceeds to 212, where the synchronization status is established. Since the frames are not synchronized, the initial encounter of an unavailable slot may indicate that the synchronization status is modulo x. In the example, the synchronization status is modulo 16. Counter k is set to $k=1$ at step 216. The last unavailable slot counter $k_{last}$ is set to $k=1$ at step 220. The method then proceeds to step 222.

If the frames are synchronized at step 208, the method proceeds to step 224. If the counter k is correctly tracking unavailable slots, then counter $k=1$ or $k=p_i$. Counter k may be at a next unavailable slot $p_i$ at step 224. In the example, $p_i=p_1=9$. If counter k is at a next unavailable slot $p_i$ at step 224, the method proceeds to step 228, where the synchronization status is established. Since the frames are synchronized, the encounter of the next unavailable slot may indicate that the synchronization status is modulo y, where $y<x$. In the example, $y=x/2=8$, and the synchronization status is modulo 8. The method then proceeds to step 220.

If counter k is not at a next unavailable slot $p_i$ at step 224, the method proceeds to step 232. Counter k may be at $k=1$ at step 232. If counter $k=1$ at step 232, the method proceeds to step 222. If counter $k\neq 1$ at step 232, the method proceeds to step 236. If counter $k\neq 1$ and $k\neq p_i$, then the detected unavailable slot is an unexpected unavailable slot. Counter k may have the same value as last unavailable slot counter $k_{last}$ at step 236. If counter $k=k_{last}$ at step 236, the method proceeds to step 212, where the synchronization status is established.

If counter $k\neq k_{last}$ at step 236, the method proceeds to step 240, where counter k may have the same value as $k_{last}$ mod $p_i$. In the example, $k_{last}$ mod $p=k_{last}$ mod 8. If counter $k=k_{last}$ mod $p_i$, the method proceeds to step 228, where the synchronization status is established. If counter $k\neq k_{last}$ mod $p_i$, the method proceeds to step 244, where last unavailable slot counter $k_{last}$ is set to the value of counter k. The method then proceeds to step 222.

Counter k is incremented to $k+1$ at step 222. The method may continue at step 250. If the method is to continue, the method returns to step 204, where an unavailable slot may be detected. If the method is not to continue, the method terminates.

Modifications, additions, or omissions may be made to the method without departing from the scope of the invention. The method may include more, fewer, or other steps. Additionally, steps may be performed in any suitable order without departing from the scope of the invention. According to one embodiment, the method may be performed to check for synchronization when a new slot power value becomes available. After synchronization, the method may be performed with less frequency or not at all.

Certain embodiments of the invention may provide one or more technical advantages. A technical advantage of one embodiment may be that a next diversity parameter adjustment may be determined by establishing the boundaries of slots of a feedback signal that reflects the feedback information and estimating the slot power values of the slots. Establishing the slot boundaries may provide for more accurate estimation of slot power values. A technical advantage of another embodiment may be that the frame timing of the signal is determined using the slot power values. A transmit diversity control technique is applied in accordance with the frame timing to determine the next diversity parameter adjustment.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method for establishing a plurality of slot boundaries of a plurality of slots, comprising:
   receiving a feedback signal reflecting feedback information describing a signal modified according to a diversity parameter adjustment, the feedback signal comprising a control signal, the feedback signal comprising a plurality of slots, a slot comprising a plurality of periods, a period comprising a plurality of bits; and
   establishing a slot boundary for each slot of the plurality of slots by:
      partitioning the plurality of bits into the plurality of periods;
      comparing at least some of the bits of at least some of the plurality of periods by:
         establishing a density of bits having a value of one for each period of the at least some of the plurality of the periods;
         calculating a plurality of differences between the densities of bits having a value of one of the at least some of the plurality of periods; and
         determining a plurality of power transitions from the plurality of differences; and
      establishing the slot boundaries in accordance with the comparison.

2. The method of claim 1, further comprising estimating a slot power value for each slot of the plurality of slots by:
   identifying one or more power samples of each slot according to the slot boundary of each slot; and
   calculating the slot power value of each slot from the one or more power samples.

3. The method of claim 1, wherein comparing at least some of the bits of at least some of the plurality of periods further comprises:
   estimating a period power value for each period of the at least some periods; and
   determining a plurality of power transitions from the period power values.

4. The method of claim 1, wherein comparing at least some of the bits of at least some of the plurality of periods further comprises:

estimating a period power value for each period from the densities of bits having a value of one; and determining a plurality of power transitions from the period power values.

5. The method of claim 1, wherein establishing the slot boundary for each slot of the plurality of slots further comprises:

establishing the slot boundary in accordance with the plurality of power transitions.

6. A method for establishing a plurality of slot boundaries of a plurality of slots, comprising:

receiving a feedback signal reflecting feedback information describing a signal modified according to a diversity parameter adjustment, the feedback signal comprising a control signal, the feedback signal comprising a plurality of slots, a slot comprising a plurality of periods, a period comprising a plurality of bits; and establishing a slot boundary for each slot of the plurality of slots by:

detecting a first power transition of the slot;

comparing at least some of the bits of at least some of the plurality of periods to detect a first power transition of the slot and a second power transition of the slot, wherein the second power transition is different from the first power transition; and establishing the slot boundaries in accordance with the difference.

7. A system for establishing a plurality of slot boundaries of a plurality of slots, comprising:

an input operable to:

receive a feedback signal reflecting feedback information describing a signal modified according to a diversity parameter adjustment, the feedback signal comprising a control signal, the feedback signal comprising a plurality of slots, a slot comprising a plurality of periods, a period comprising a plurality of bits; and a processor operable to:

establish a slot boundary for each slot of the plurality of slots by:

partitioning the plurality of bits into the plurality of periods;

comparing at least some of the bits of at least some of the plurality of periods by:

establishing a density of bits having a value of one for each period of the at least some of the plurality of the periods;

calculating a plurality of differences between the densities of bits having a value of one of the at least some of the plurality of periods; and determining a plurality of power transitions from the plurality of differences; and establishing the slot boundaries in accordance with the comparison.

8. The system of claim 7, the processor further operable to estimate a slot power value for each slot of the plurality of slots by:

identifying one or more power samples of each slot according to the slot boundary of each slot; and calculating the slot power value of each slot from the one or more power samples.

9. The system of claim 7, the processor further operable to compare at least some of the bits of at least some of the plurality of periods by:

estimating a period power value for each period of the at least some periods; and determining a plurality of power transitions from the period power values.

10. The system of claim 7, the processor further operable to compare at least some of the bits of at least some of the plurality of periods by:

estimating a period power value for each period from the densities of bits having a value of one; and determining a plurality of power transitions from the period power values.

11. The system of claim 7, the processor further operable to establish the slot boundary for each slot of the plurality of slots by:

establishing the slot boundary in accordance with the plurality of power transitions.

12. A system for establishing a plurality of slot boundaries of a plurality of slots, comprising:

an input operable to:

receive a feedback signal reflecting feedback information describing a signal modified according to a diversity parameter adjustment, the feedback signal comprising a control signal, the feedback signal comprising a plurality of slots, a slot comprising a plurality of periods, a period comprising a plurality of bits; and a processor operable to:

establish a slot boundary for each slot of the plurality of slots by:

detecting a first power transition of the slot;

comparing at least some of the bits of at least some of the plurality of periods to detect a first power transition of the slot and a second power transition of the slot, wherein the second power transition is different from the first power transition; and establishing the slot boundaries in accordance with the difference.

13. A system for establishing a plurality of slot boundaries of a plurality of slots, comprising:

means for receiving a feedback signal reflecting feedback information describing a signal modified according to a diversity parameter adjustment, the feedback signal comprising a control signal, the feedback signal comprising a plurality of slots, a slot comprising a plurality of periods, a period comprising a plurality of bits; and means for establishing a slot boundary for each slot of the plurality of slots by:

partitioning the plurality of bits into the plurality of periods;

comparing at least some of the bits of at least some of the plurality of periods by:

establishing a density of bits having a value of one for each period of the at least some of the plurality of the periods;

calculating a plurality of differences between the densities of bits having a value of one of the at least some of the plurality of periods; and determining a plurality of power transitions from the plurality of differences; and establishing the slot boundaries in accordance with the comparison.

* * * * *